Patented Sept. 12, 1939

2,172,763

UNITED STATES PATENT OFFICE 2,172,763

ANTHRAQUINONE ACID WOOL DYESTUFF

Henry R. Lee, South Milwaukee, Wis., assignor to E. I. du Pont de Nemours & Company, Wilmington, Del., a corporation of Delaware No Drawing. Application March 30, 1938, Serial No. 198,895

1 Claim. (Cl. 260—374)

This invention relates to the preparation of a new and valuable acid wool dyestuff of the arylaminoanthraquinonesulfonic acid series and more particularly to the preparation of 1-amino-2-methyl-4-cresidinoanthraquinonesulfonic acid

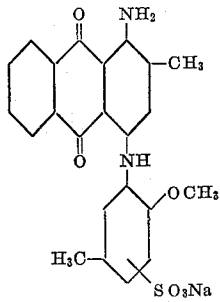

as a new compound which dyes wool in desirable blue shades.

Arylaminoanthraquinonesulfonic acids and more particularly those of the type of 1-amino-4-arylaminoanthraquinonesulfonic acid which carry the sulfonic acid group in the aryl radical constitute a well known class of dyestuffs. Certain dyestuffs of this particular series, however, suffer from the defect that they exhibit a different color in artificial light from the normal color they exhibit in daylight. Some of these colors show this effect to a greater extent than others. 1-amino-2-methyl-4-p-toluidoanthraquinonesulfonic acid is a well recognized commercial color of this series which dyes in reddish blue shades. This color, because of its fastness properties, has received wide acceptance in the trade. It suffers, however, from the serious defect of exhibiting a very undesirable change in color when viewed under artificial light. Attempts have been made to produce a dyestuff in this series which will dye in purer blue shades than 1-amino-2-methyl-4-p-toluidoanthraquinonesulfonic acid and which would also show less change in color when viewed in artificial light. A large number of compounds have been prepared in an effort to find a desirable blue color of this series which can be used in conjunction with the other dyestuffs of this well known and widely accepted class of acid wool dyestuffs.

It is an object of this invention to prepare a blue acid wool dyestuff of the 1-amino-4-arylaminoanthraquinonesulfonic acid series which will dye in more pure blue shades than the 1-amino-2-methyl-4-p-toluidoanthraquinonesulfonic acid and which will exhibit much less change in color when viewed in artificial light.

I have found that a very desirable blue dyestuff can be prepared by condensing 1-amino-2-methyl-4-bromoanthraquinone with cresidine (1-amino-2-methoxy-5-methylbenzene) by the methods normally used in the condensation of this anthraquinone base with arylamines, and then sulfonating the resulting arylaminoanthraquinone in the usual manner for the introduction of one sulfonic acid group into the molecule.

The following example is given to illustrate the invention more fully.

Example 1

1 part of 1-amino-2-methyl-4-bromoanthraquinone, 6 parts of cresidine (1-amino-2-methoxy-5-methyl-benzene), .02 part of verdigris, .9 part of ammonium acetate and 1.5 parts of water are heated under reflux at temperatures of about 105° C. for approximately six hours. After cooling to 80° C. the mass is diluted with 5.5 parts of 95% ethyl alcohol, cooled to 40° C., filtered, and the filter cake washed with 95% alcohol to give a comparatively clear filtrate. The filter cake is dried at steam bath temperature. This color base is then dissolved in 10 parts of 100% sulfuric acid and sulfonated by the addition of 2 parts of 60% oleum at room temperature (20 to 30° C.). Sulfonation is finished when a test sample shows complete solubility in water. This reaction usually requires approximately one hour. When the sulfonation is completed the mass is run into 20 parts of ice and water, the temperature being maintained below 30° C. It is then cooled to 20–25° C. and filtered. The filter cake is washed with 5% brine until acid free. The product may be further purified by dissolving in boiling water, filtering, reprecipitating the color by salting and filtering. The filter cake is washed with 2% brine solution and dried. This product, which is 1-amino-2-methyl-4(2'-methoxy-5'methylanilido) anthraquinonesulfonic acid sodium salt, dyes wool in appreciably greener shades of blue than the well known 1-amino-2-methyl-4-p-toluidoanthraquinonesulfonic acid of commerce. It also exhibits much less change in artificial light.

It will be obvious to those skilled in the art that numerous modifications in the above process may be made without departing from the spirit of applicant's invention; for example, any of the acid binding agents mentioned in U. S. Patent 1,931,265 may be employed in place of ammonium acetate. The ammonium acetate may also be formed in solution by the reaction of ammonium hydroxide and acetic acid. The amounts of acid binding agents and the concentration of the aqueous solution may be varied within reasonable limits without materially effecting the yield or quality of the resulting dyestuff. This reaction may also be carried out by the usual anhydrous condensation methods.

I claim:

Compounds of the class consisting of 1-amino-2-methyl-4-(2'-methoxy-5'-methyl-anilido)anthraquinonesulfonic acid which carries the sulfonic acid radical in the aryl ring of the anilido nucleus, and its alkali-metal salts.

HENRY R. LEE.